(12) United States Patent
Davos

(10) Patent No.: US 9,446,800 B2
(45) Date of Patent: Sep. 20, 2016

(54) VEHICLE CROSS-SUPPORT MEMBER WITH HYBRID METAL JOINT

(71) Applicant: VAN-ROB INC., Aurora (CA)

(72) Inventor: Peter Davos, Toronto (CA)

( * ) Notice: Subject to any disclaimer, the term of this patent is extended or adjusted under 35 U.S.C. 154(b) by 0 days.

(21) Appl. No.: 14/693,382

(22) Filed: Apr. 22, 2015

(65) Prior Publication Data

US 2015/0344080 A1 Dec. 3, 2015

Related U.S. Application Data

(60) Provisional application No. 62/005,035, filed on May 30, 2014.

(51) Int. Cl.
| | |
|---|---|
| *B60J 7/00* | (2006.01) |
| *B62D 29/00* | (2006.01) |
| *B62D 25/14* | (2006.01) |
| *B62D 27/02* | (2006.01) |

(52) U.S. Cl.
CPC ........... *B62D 29/001* (2013.01); *B62D 25/145* (2013.01); *B62D 27/02* (2013.01)

(58) Field of Classification Search
CPC .... B65H 9/105; G04C 21/18; B24B 23/022; B26B 21/22; B29C 45/4005; A61M 5/008; A61M 5/24; A61M 5/31511; A61M 5/31515; A61M 5/502; B62D 21/15; B62D 25/145
USPC .................................................. 296/193.02
See application file for complete search history.

(56) References Cited

U.S. PATENT DOCUMENTS

| | | | | |
|---|---|---|---|---|
| 5,868,426 A | * | 2/1999 | Edwards | B62D 25/147 180/90 |
| 6,391,470 B1 | * | 5/2002 | Schmieder | B62D 25/145 280/779 |
| 6,921,128 B2 | * | 7/2005 | Davis, Jr. | B60R 21/045 296/187.05 |
| 7,086,665 B2 | * | 8/2006 | Lee | B62D 1/16 280/779 |
| 7,367,613 B2 | * | 5/2008 | Ellison | B62D 25/145 296/193.02 |
| 7,407,221 B2 | * | 8/2008 | Kring | B62D 25/145 296/193.02 |
| 7,484,792 B2 | * | 2/2009 | Penner | B60R 7/06 280/752 |
| 7,503,622 B2 | * | 3/2009 | Vican | B62D 25/145 296/190.03 |
| 7,703,829 B2 | * | 4/2010 | Miki | B60R 21/045 280/748 |
| 7,874,587 B2 | * | 1/2011 | Miki | B60R 7/06 280/752 |
| 7,921,564 B2 | * | 4/2011 | Baudart | B62D 25/142 29/428 |

(Continued)

*Primary Examiner* — Kiran B Patel

(57) ABSTRACT

There is provided in a preferred embodiment a vehicle cross-support member for positioning in a generally transverse orientation to a length of a vehicle, the cross-support member including a jointed portion extending from a first end to a second end, wherein the jointed portion includes a first elongated member and a second elongated member mechanically coupled to the first elongated member. The first elongated member includes an axially open socket end portion, and the second elongated member includes a mating end portion sized for fitted placement within the socket end portion in frictional engagement therewith in a mechanically coupled position.

8 Claims, 5 Drawing Sheets

(56) References Cited

U.S. PATENT DOCUMENTS

| | | | |
|---|---|---|---|
| 8,020,355 B2* | 9/2011 | Monteiro | B62D 25/145 29/447 |
| 8,029,045 B2* | 10/2011 | Merkle | B62D 25/145 296/193.02 |
| 8,393,671 B2* | 3/2013 | Watanabe | B62D 25/147 296/193.02 |
| 8,424,207 B2* | 4/2013 | Nakano | B22C 9/22 164/129 |
| 8,485,590 B2* | 7/2013 | Maurer | B62D 29/008 296/193.02 |
| 8,491,037 B2* | 7/2013 | Sheng | B60R 21/045 296/187.05 |
| 8,801,087 B2* | 8/2014 | Kim | B62D 25/145 296/193.02 |
| 8,919,855 B2* | 12/2014 | Ruiz Rincon | B62D 25/145 296/193.02 |
| 8,939,497 B2* | 1/2015 | Baudart | B62D 25/147 296/193.02 |
| 8,950,778 B2* | 2/2015 | Fukushima | B62D 25/145 280/779 |
| 9,004,580 B2* | 4/2015 | Vican | B62D 25/147 280/752 |
| 9,085,096 B2* | 7/2015 | Wenzel | B29C 45/006 |
| 9,150,257 B2* | 10/2015 | Baudart | B62D 25/145 |
| 9,162,708 B2* | 10/2015 | Matsushita | B62D 25/145 |
| 9,162,714 B2* | 10/2015 | Maier | B62D 25/085 |
| 9,205,721 B2* | 12/2015 | Herr-Rathke | B62D 25/08 |
| 9,227,671 B2* | 1/2016 | Aoki | B62D 21/15 |
| 9,233,720 B2* | 1/2016 | Saje | B62D 25/20 |
| 9,283,995 B2* | 3/2016 | Hisazumi | B62D 25/081 |
| 9,296,409 B2* | 3/2016 | Aoki | B62D 1/16 |
| 9,302,714 B2* | 4/2016 | Kropla | B60R 21/0136 |
| 9,340,236 B2* | 5/2016 | Kong | B62D 1/16 |
| 2009/0152898 A1* | 6/2009 | Kawamura | F16L 13/147 296/193.02 |
| 2014/0049075 A1* | 2/2014 | Kasper | B62D 25/145 296/205 |
| 2014/0125086 A1* | 5/2014 | Da Costa Pito | B62D 25/145 296/72 |

* cited by examiner

VEHICLE CROSS-SUPPORT MEMBER WITH HYBRID METAL JOINT

RELATED APPLICATIONS

This application claims the benefit of 35 U.S.C. 119(e) to U.S. Provisional Patent Application Ser. No. 62/005,035 filed on May 30, 2014.

FIELD OF THE INVENTION

This invention relates to a vehicle cross-support member which in a most preferred embodiment includes a plurality of axially-joined elongated members of different materials for optimizing strength and rigidity, whilst minimizing manufacturing costs. The invention further relates to a method of manufacturing the vehicle cross-support member, most preferably in a vehicle assembly line, involving axially engaging the longitudinal sections using most preferably interference fit.

BACKGROUND OF THE INVENTION

In the automobile industry, vehicle cross-support members, which is also known as crossbeams, cross car beams, and other similar components (collectively referred hereinafter as "vehicle cross-support members" or "cross-support members") are utilized as part of the vehicular body structure. The vehicle cross-support member normally spans between or fastened to a pair of laterally disposed vertical pillars, or A-pillars, in the region generally below the windscreen and a cowl top, and between a forward engine compartment and a rearward passenger compartment, so as to extend in a direction transverse to the length of an automobile. As part of a motor vehicle body, the cross-support member provides for cross car stiffness and rigidity against for example side load impacts.

Located forwardly of the driver and the front-row passenger, the cross-support member also supports or provides mounting surfaces for various vehicle components, including an instrument panel, a glove and/or storage compartment, a center console, a dashboard and a steering column member.

In view of the various forces and loads which may be placed on or transferred to the cross-support member during vehicle operation, it is an important consideration in the design and manufacture of a vehicle that the cross-support member possesses or provides for improved Noise, Vibration and Harshness ("NVH") performance, stiffness, strength and load path. Commercially, it is also of significant consideration that the cross-support member permits more standardized and customizable assembly and installation in vehicles of differing performance requirements and price points, without significantly increasing mechanical or manufacturing complexities.

SUMMARY OF THE INVENTION

One possible non-limiting object of the present invention is to provide a vehicle cross-support member for placement in a generally transverse orientation to a length of a vehicle, and which is designed for permitting improved and more cost-effective assembly and installation without significantly compromising NVH performance, and structural rigidity and strength.

Another possible non-limiting object of the present invention is to provide a vehicle cross-support member for placement in a generally transverse orientation to a length of a vehicle, and which may be configured to incorporate components made with different materials, while avoiding significant increases to manufacturing cost or complexity.

Another possible non-limiting object of the present invention is to provide a method for preparing a vehicle cross-support member, and which may readily be configured and installed in vehicles of differing performance and price points in an automobile assembly line.

In view of the disadvantages of previously known devices, the present invention provides in one simplified aspect a vehicle cross-support member positionable in a generally transverse orientation to a length of a vehicle, the vehicle cross-support member comprising first and second longitudinal sections coupled at respective axial joint end portions most preferably by interference fit.

In one aspect, the present invention provides a vehicle cross-support member positionable in a generally transverse orientation to a length of a vehicle, the vehicle cross-support member comprising first and second adjacent longitudinal sections coupled at respective axial joint end portions by interference fit, the first longitudinal section comprising in the respective axial joint end portion a pair of longitudinally spaced annular ridge members and a peripheral engagement surface portion extending therebetween; and the second longitudinal section defining in the respective axial joint end portion a generally hollow interior with an interior surface profile sized to frictionally engage the peripheral engagement surface portion.

Preferably, each said longitudinal section comprises an elongated tubular member defining a generally hollow interior, the tubular member having a cross-section shape selected from the group consisting of a circle, an ellipse, a triangle, a square, a hexagon, and an octagon. Each said longitudinal section is preferably formed as an extruded tubular member prepared with a material comprising aluminum, steel, magnesium and/or carbon fiber.

Preferably, each said longitudinal section comprises a vehicle attachment end portion located at an axial end distal to the axial joint end portion, the vehicle attachment end portion being shaped for direct or indirect attachment to a lateral structural member of the vehicle.

Preferably, the first and second longitudinal sections are formed as passenger side and driver side sections, respectively, the passenger side and driver side sections being positionable in the vehicle proximal to a front passenger compartment and a driver compartment, respectively. The passenger side and driver side sections preferably comprise elongated steel and aluminum tubular members, respectively, each said elongated tubular member having a circular cross-section, wherein the passenger side section has a length greater than that of the driver side section, and wherein the passenger side section has an outer diameter less than that of the driver side section.

In one embodiment, the axial joint end portion of the second longitudinal section is provided with a joint engagement barrel defining the hollow interior. The joint engagement barrel may be provided as an integral component of the axial joint end portion, or in the alternative, a separate component to be secured or welded to the axial joint end portion. When provided as a separate component, the second longitudinal section defines in the joint end portion an axially open end sized to longitudinally receive the joint engagement barrel, and the second longitudinal section is welded to the joint engagement barrel. For more secure welding, the second longitudinal section and the separate joint engagement barrel comprise the same material. Most preferably, in the assembled arrangement, each of the two axial ends of the joint engagement barrel is in abutting contact with an associated one of the annular ridge members.

Preferably, the annular ridge members comprise compression beads. To prevent relative rotational movement between the first and second longitudinal sections, one or both of the annular ridge members comprise one or more stop tabs sized to be received in associated longitudinally recessed slots defined by the rims located in the axial ends of the joint engagement barrel.

In one embodiment, the first longitudinal section comprises a first generally hollow tube and a second tube sized to be partially received longitudinally in the interior of the first tube, the second tube comprising an outwardly extending rim located distal to the first tube, wherein in the assembled arrangement, the second tube is longitudinally received in the hollow interior of the joint engagement barrel in frictional engagement therewith, and the joint engagement barrel is in abutting contact with the outwardly extending rim and an axial end of the first tube.

In another aspect, the present invention provides a method for manufacturing the cross-support member, method comprising forming a first one of said annular ridge members at a pre-determined longitudinal position in the axial joint end portion of the first longitudinal section to define an insertion portion; longitudinally inserting the insertion end portion into the hollow interior such that the axial joint end portion of the second longitudinal section abuts against the first annular ridge member, the interior surface frictionally engaging the outer peripheral surface of the insertion portion; and forming the other said annular ridge member in abutting contact with the axial end portion of the second longitudinal section.

In yet another aspect, the present invention provides a vehicle cross-support member for positioning in a generally transverse orientation to a length of a vehicle, the cross-support member comprising a jointed portion extending longitudinally from a first end to a second end, wherein the jointed portion comprises a first elongated member and a second elongated member mechanically coupled to the first elongated member, the first elongated member comprising a first body portion extending longitudinally from the first end to an axially open socket end portion, wherein the socket end portion comprises an inwardly tapering sidewall portion and a reduced diameter engagement barrel integral with the tapering sidewall portion, the engagement barrel extending longitudinally from the tapering sidewall portion to define an axially open end and an inner engagement surface, and the second elongated member comprising a second body portion extending longitudinally from the second end to a mating end portion, wherein the mating end portion comprises: an insertion rod sized for fitted placement into the axially open end, the insertion rod comprising an outer engagement surface for frictional engagement with the inner engagement surface in a mechanically coupled position; an annular seating flange extending generally outwardly from the insertion rod for seated engagement with an inner surface of the tapering sidewall portion; and an annular abutment flange formed adjacent to the insertion rod, the abutment flange being engageable with the engagement barrel to limit axial movement of the mating end portion inwardly through the axially open end, wherein in the mechanically coupled position, said frictional engagement between the insertion rod and the engagement barrel fixedly secures the first and second elongated members in a weldless connection.

In yet another aspect, the present invention provides a vehicle cross-support member for positioning in a generally transverse orientation to a length of a vehicle, the cross-support member comprising a jointed portion extending longitudinally from a first end to a second end, wherein the jointed portion comprises a first elongated member and a second elongated member coupled to the first elongated member, the first elongated member comprising a first body portion extending longitudinally from the first end to an axially open socket end portion, wherein the socket end portion comprises an inwardly tapering sidewall portion defining an axially open end, and the second elongated member comprising a second body portion extending longitudinally from the second end to a mating end portion, wherein the mating end portion comprises an insertion rod assembly having: an insertion rod comprising an outer engagement surface and a pair of longitudinally spaced annular abutment flanges, wherein the outer engagement surface extends between the abutment flanges; and an engagement barrel comprising an inner engagement surface frictionally engaging the outer engagement surface to fixedly retain the engagement barrel and the insertion rod in a mechanically coupled position, wherein the abutment flanges bear against the engagement barrel to limit axial movement thereof relative to the insertion rod, wherein the mating end portion is received into the axially open end with a periphery of the engagement barrel being coupled to the inwardly tapering sidewall portion adjacent to the axially open end to thereby fixedly secure the first and second elongated members.

In yet another aspect, the present invention provides a vehicle cross-support member for positioning in a generally transverse orientation to a length of a vehicle, the cross-support member comprising a jointed portion extending longitudinally from a first end to a second end, wherein the jointed portion comprises a first elongated member and a second elongated member mechanically coupled to the first elongated member, the first elongated member comprising a first body portion extending longitudinally from the first end to an axially open socket end portion, and the second elongated member comprising a second body portion extending longitudinally from the second end to a mating end portion, the mating end portion being sized for fitted placement within the socket end portion in frictional engagement therewith in a mechanically coupled position, wherein in the mechanically coupled position, said frictional engagement between the socket end portion and the mating end portion fixedly secures the first and second elongated members.

The socket end portion preferably comprises an inwardly tapering sidewall portion and an engagement barrel coupled to the sidewall portion, the engagement barrel extending longitudinally to define an axially open end and an inner engagement surface, and the mating end portion comprises an outer engagement surface and an annular abutment flange disposed adjacent to the outer engagement surface, the outer engagement surface being sized for the frictional engagement with the inner engagement surface in the mechanically coupled position, wherein the abutment flange abuts against the engagement barrel to limit axial movement thereof relative to the mating end portion.

In one embodiment, the engagement barrel is integral with the tapering sidewall portion to extend longitudinally therefrom to define the axially open end, the abutment flange being engageable with the engagement barrel adjacent to the axially open end to limit axial movement of the mating end portion inwardly therethrough, and the mating end portion further comprises an annular sealing flange extending generally outwardly from the insertion rod for seated engagement with an inner surface of the tapering sidewall portion.

In an alternative embodiment, the tapering sidewall portion defines an axially open aperture, the engagement barrel being received into the aperture with a periphery of the engagement barrel being welded to the tapering sidewall portion adjacent to the aperture, and the mating end portion comprises a pair of the abutment flanges bearing against the engagement barrel to limit axial movement thereof relative to the outer engagement surface.

Preferably, each said first and second elongated members comprises a hollow tubular body having a lateral cross-sectional profile selected from the group consisting of a circle, an ellipse, a square, a triangle, a rectangle, a parallelogram, a trapezoid, a pentagon, a hexagon and an octagon. It is to be appreciated that each of the first and second elongated members are not strictly restricted to having a single uniform cross-sectional profile, and may include a plurality of longitudinal sections each having a different or same cross-sectional profile. More preferably, each said first and second elongated members is formed as a generally cylindrical tubular member, and the inner and outer engagement surfaces comprise a substantially identical radius to effect an interference fit therebetween in the mechanically coupled position.

In one embodiment, the engagement barrel comprises a rim disposed adjacent to the axially open end, the rim defining one or more longitudinally recessed slots, and the abutment flange comprises one or more retention tabs each positioned to be received in an associated one of the recessed slots to prevent rotation of the engagement barrel relative to the insertion rod. Alternatively, the engagement barrel may include a rim defining one or more longitudinally recessed slots, one of the abutment flanges bearing against the rim, wherein the one abutment flange comprises one or more retention tabs each positioned to be received in an associated one of the recessed slots to prevent rotation of the engagement barrel relative to the insertion rod.

To prevent relative movement between the engagement barrel and the insertion rod, the outer engagement surface preferably defines a surface opening or an inwardly oriented depression, and the inner engagement surface comprises a retention member sized to be at least partially received in the opening or depression.

Each said seating and abutment flanges preferably comprises a compression bead integrally formed on the mating end portion by applying generally longitudinal compression thereon. For added resistance or strength against potential relative axial movement of the engagement barrel during operation, each of the flanges may include two or more integrally formed compression beads.

It is to be appreciated that the first and second elongated members are not particularly limited to being prepared with any specific material or substance. Preferably, the elongated members are prepared with a metal or alloy material selected to impart structural rigidity, stiffness and strength to the vehicle cross-support member. In one embodiment, each said first and second elongated members comprises independently of each other one or more of aluminum, steel, magnesium and carbon fiber.

In a more preferred embodiment where the engagement barrel is integral with the inwardly tapering sidewall portion, the first elongated member comprises aluminum, and the second elongated member comprises steel, wherein the first elongated member is for positioning proximal to a driver side compartment of the vehicle, and the second elongated member is for positioning proximal to a front passenger compartment of the vehicle. In an alternative preferred embodiment where the engagement barrel is coupled or welded to the inwardly tapering sidewall portion, the first elongated member and the engagement barrel each comprises aluminum, and the second body portion and the insertion rod each comprises steel, wherein the first elongated member is for positioning proximal to a driver side compartment of the vehicle, and the second elongated member is for positioning proximal to a front passenger compartment of the vehicle.

In one embodiment, one or both of the first and second elongated members comprise an attachment bracket for securing the vehicle cross-support member to a lateral structural member of the vehicle.

BRIEF DESCRIPTION OF THE DRAWINGS

Reference may now be had to the following detailed description taken together with the accompanying drawings in which.

DETAILED DESCRIPTION OF THE PREFERRED EMBODIMENTS

Figure 1:
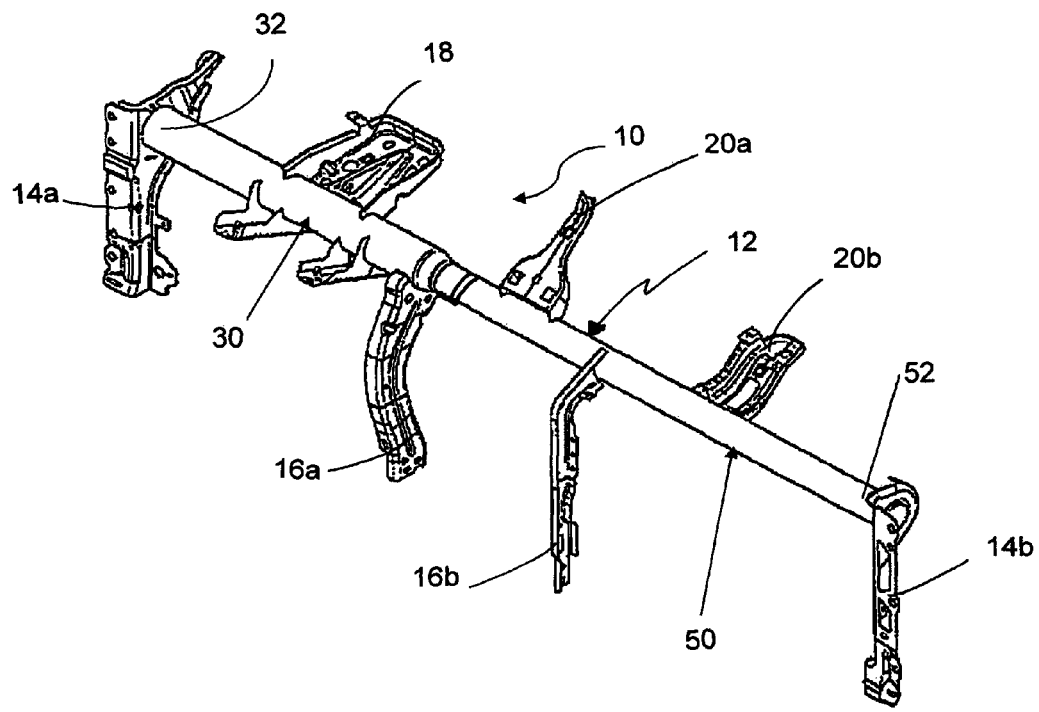
FIG. 1 is a perspective view of a motor vehicle cross-support member assembly which includes a vehicle cross-support member in accordance with a preferred embodiment of the present invention, and which is shown as coupled to a number of associated vehicle components of the cross-support member assembly.

Reference is made to FIG. 1 which shows a perspective view of a motor vehicle cross-support member assembly 10 which includes an aluminum-steel hybrid joint cross-support member 12 in accordance with a preferred embodiment of the present invention. In the construction shown, the cross-support assembly 10 includes the aluminum-steel hybrid joint cross-support member 12; a pair of lateral A-pillar attachment members 14a, 14b; transversely spaced central column support members, 16a, 16b; a steering column mounting assembly 18; and cowl top mounting brackets 20a, 20b. As shown in use, the cross-support member 12 is secured in a position with axial vehicle attachment end portions 32, 52 coupled to the A-pillar attachment members 14a, 14b, respectively.

Figure 2:
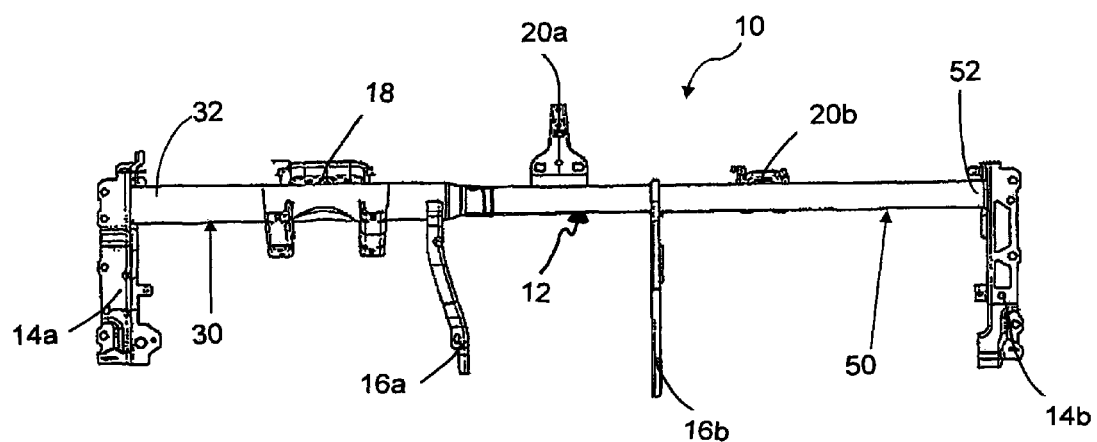
FIG. 2 is an elevational view of the cross-support member assembly shown in FIG. 1.

As will be described in greater detail below, the hybrid joint cross-support member 12 incorporates a three-piece construction which broadly includes a driver side longitudinal tube section 30, a passenger side longitudinal tube section 50 and a joint engagement barrel 70. For greater clarity, FIG. 2 shows an elevation view of the cross-support member assembly 10.

Figure 3:
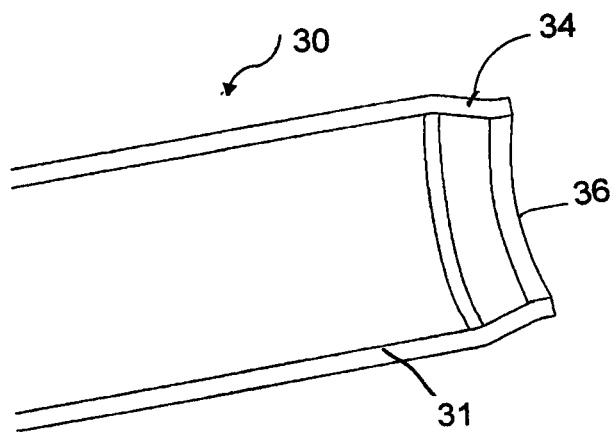
FIG. 3 is a partial cross-sectional view of a driver side longitudinal tube section of the cross-support member shown in FIG. 1.

Reference is made to FIG. 3 which shows a partial cross-sectional view of the driver side tube section 30. The tube section 30 includes a longitudinally elongated, hollow tubular aluminum sidewall 31 of substantially uniform diameter and thickness along the length, and which extends axially from the vehicle attachment end portion 32 towards a beveled joint engagement end portion 34. FIG. 3 shows best the joint engagement end portion 34 as having an inwardly tapered sidewall which defines an end joint engagement aperture 36. The aperture 36 is formed as having reduced internal and external diameters compared to those of the remaining tubular sidewall 31. As will be described, the joint engagement aperture 36 is sized to receive therein in a mated fit manner both end portions of the passenger side tube section 50 and the joint engagement barrel 70.

Although not strictly limited, the driver side section 30 preferably has a length between about 30 cm and about 150 cm; an outer diameter between about 3 cm and about 15 cm; and a thickness between about 0.1 cm and about 1 cm. The joint engagement aperture 36 preferably has an inner diameter between about 2 cm and about 12 cm.

Figure 4:
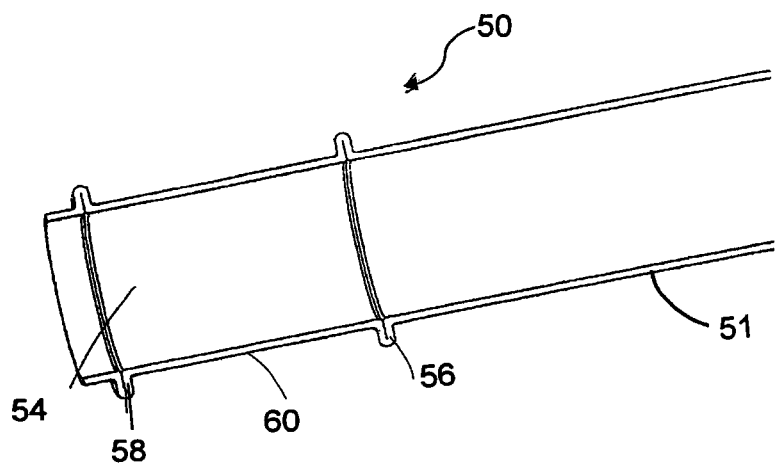
FIG. 4 is a partial cross-sectional view of a passenger side longitudinal tube section of the cross-support member shown in FIG. 1.

Reference is now made to FIG. 4 which shows a partial cross-sectional view of the passenger side tube section 50. The tube section 50 includes a longitudinally elongated, hollow tubular sidewall 51 of generally uniform diameter and thickness, and which is made with a material different from that of the sidewall 31, or namely steel. The tubular sidewall 51 extends axially from the vehicle attachment end portion 52 towards a mating end portion 54. The mating end portion 54 includes a tubular barrel engagement sidewall 60 extending from a first annular compression bead 56 of enlarged diameter located adjacent to the sidewall 51. The mating end portion 54 further includes a second annular compression bead 58 longitudinally spaced from the first compression bead 56, such that the barrel engagement sidewall 60 extends between the compression beads 56, 58. As will be described, the outer peripheral surface of the barrel engagement sidewall 60 is sized to frictionally engage an interior surface of the joint engagement barrel 70.

Figure 7:
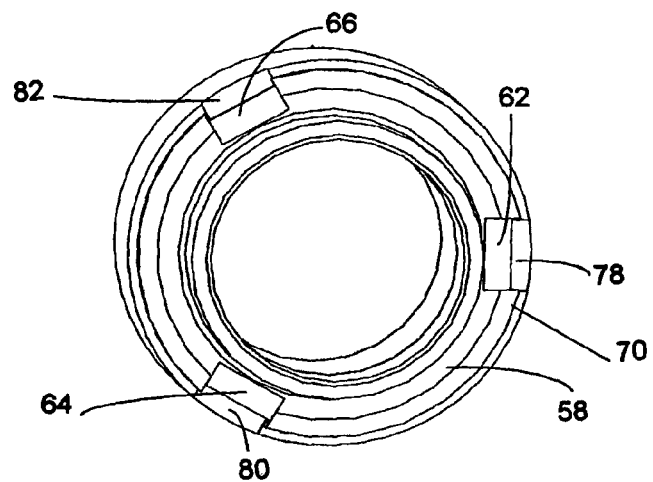
FIG. 7 is a sectional perspective view of the passenger side longitudinal tube section and the joint engagement barrel shown in FIGS. 4 and 5, respectively.

As best shown in FIG. 7, the second compression bead 58 includes a plurality of annularly spaced engagement tabs 62, 64, 66 extending towards the first compression bead 56 for effecting interlocking engagement with the joint engagement barrel 70 as will be described below.

The passenger side tube section 50 preferably has a length between about 50 cm and about 180 cm; an outer diameter between about 2 cm and 10 cm; and a thickness between about 0.05 cm and about 0.5 cm. Each of the compression beads 56, 58 preferably extends annularly between about 0.1 cm and about 1 cm from an outer surface of the sidewalls 51, 60, and are longitudinally spaced between about 0.5 cm and about 10 cm. The barrel engagement sidewall 60 most preferably have an outer diameter and thickness identical to those of the sidewall 51. The sidewall 60 may however incorporate differing dimensions depending on the dimensions of the joint engagement barrel 70.

Figure 5:
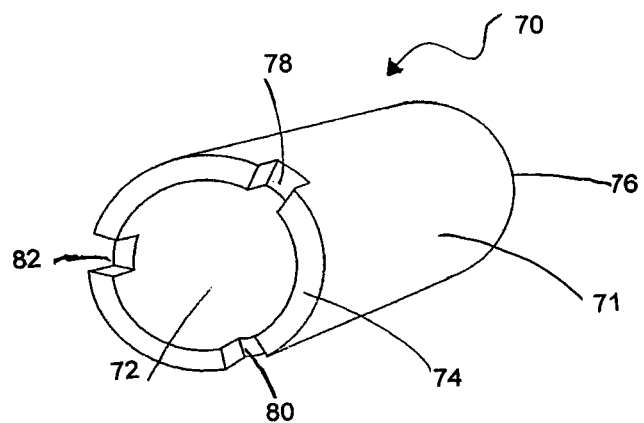
FIG. 5 is a perspective end view of a joint engagement barrel of the cross-support member shown in FIG. 1.

FIG. 5 shows best a perspective end view of the joint engagement barrel 70. The barrel 70 includes a generally cylindrical body having a sidewall 71 which defines a hollow interior 72 extending between first and second axially open ends 74, 76. The joint engagement barrel 70 is specifically made with the same aluminum material used for forming the driver side tube section 30. At the first open end 74, the sidewall 71 defines a plurality of longitudinally recessed slots 78, 80, 82. The slots 78, 80, 82 are annularly spaced along the periphery of the open end 74, and as will be described, are used for effecting interlocking engagement with the passenger side tube section 50.

The joint engagement barrel 70 preferably has a length between about 0.5 cm and about 10 cm; an outer diameter between about 3 cm and 12 cm; and a thickness between about 0.1 cm and 1 cm.

Figure 6:
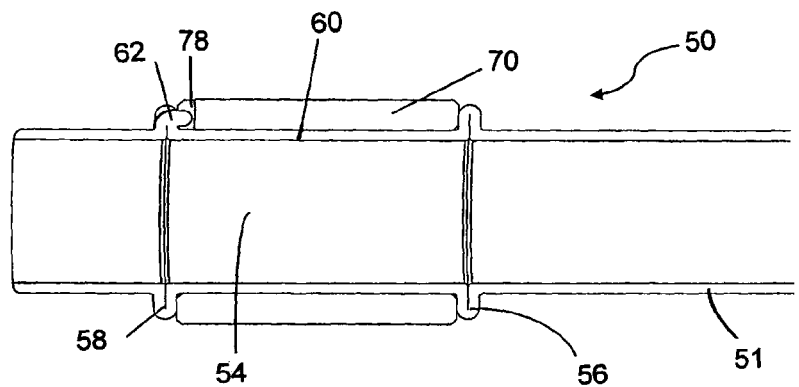
FIG. 6 is a partial cross-sectional view of the passenger side longitudinal tube section and the joint engagement barrel shown in FIGS. 4 and 5, respectively.
Figure 8:
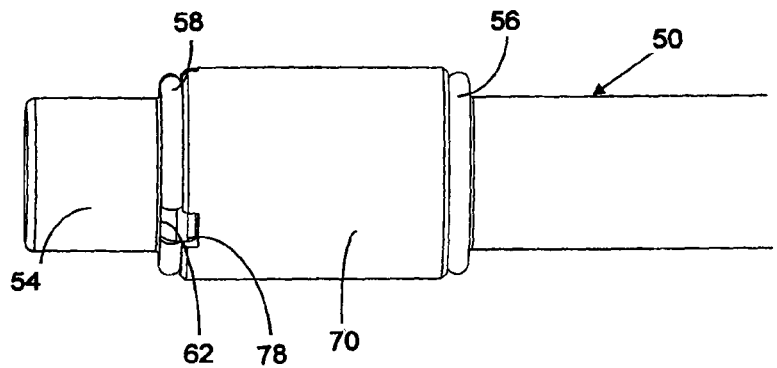
FIG. 8 is an elevation view of the passenger side longitudinal tube section and the joint engagement barrel shown in FIGS. 4 and 5, respectively.
Figure 9:
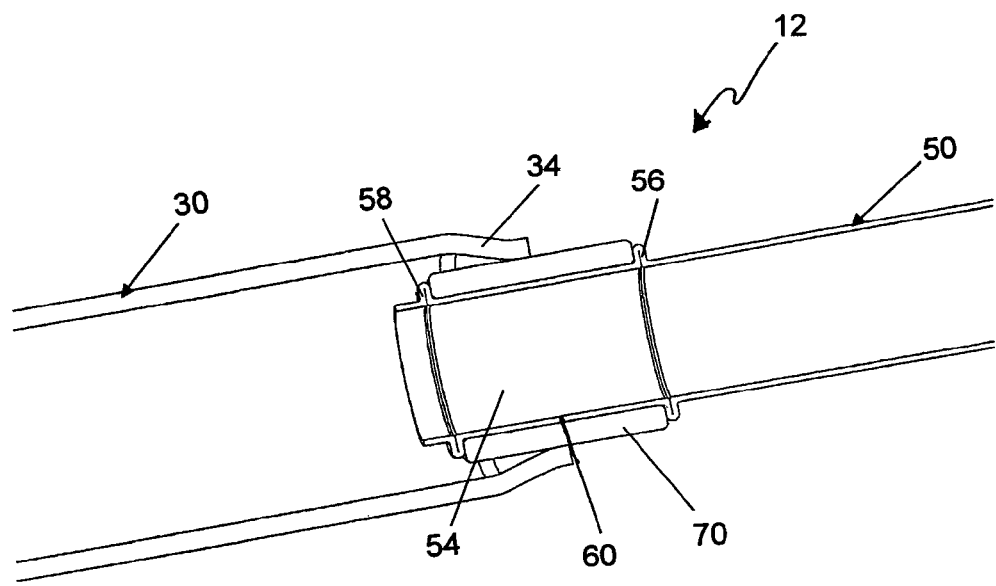
FIG. 9 is a partial cross-sectional view of the cross-support member shown in FIG. 1.

For assembly, the passenger side tube section 50 is initially provided as a blank steel tube. The compression bead 56 is first formed at a pre-determined longitudinal position on the blank steel tube, delineating between the sidewalls 51, 60. The barrel engagement sidewall 60 is axially inserted into the hollow interior 72 through the first open end 74 of the joint engagement barrel 70 using a press or hydraulic equipment, until the periphery of the second open end 76 abuts against the pre-formed compression bead 56. The passenger side tube section 50 is pressed to form the second compression bead 58 to abut against the periphery of the first open end 74, such that the joint engagement barrel 70 is in abutting contact with both the compression beads 56, 58, with the interior surface of the joint engagement barrel 70 frictionally engaging the barrel engagement sidewall 60. As shown in FIGS. 6 to 8, peripheral portions of the second compression bead 58 longitudinally aligned with the recessed slots 78, 80, 82 are lanced to form the engagement tabs 62, 64, 66, so as to be received in an associated one of the recessed slots 78, 80, 82, and effect interlocking engagement between the passenger side tube section 50 and the joint engagement barrel 70 to prevent relative rotation therebetween.

To join the driver side and passenger side tube sections 30, 50, the barrel engagement sidewall 60 with the joint engagement barrel 70 frictionally engaged thereto is axially inserted through the joint engagement aperture 36, such that an outer peripheral surface of the barrel 70 is proximal to, or in contact with the periphery of the aperture 36. The joint engagement end portion 34 is welded to the joint engagement barrel 70 using metal inert gas welding to form the cross-support member 12 as a single integral unit.

Figure 10:
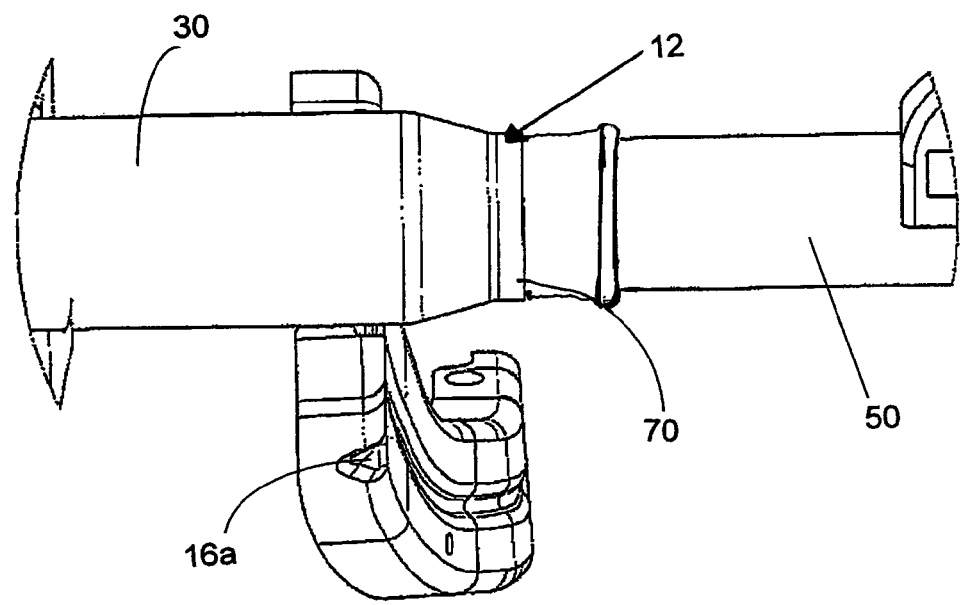
FIG. 10 is a partial top view of the cross-support member assembly shown in FIG. 1.

Although not strictly limited, as shown in FIGS. 1 and 2, the driver side tube section 30 has a length less than that of the passenger side tube section 50, the ratio of the lengths of the tube sections 30, 50 being between about 0.55 and about 0.85. FIG. 10 best shows the driver side tube section 30 secured on an upper portion of the central column support member 16a offset in a vehicle towards the driver side.

The applicant has appreciated that the hybrid joint cross-support member 12 may provide for improved cost-efficiency in that the driver side tube section 30 with increased load requirements could be constructed with aluminum materials of greater strength (and higher costs), while the passenger side tube section 50, with lesser load requirements, could be prepared separately with less expensive steel materials. Such construction may allow for an improved component design with more optimal balance between performance and cost.

It is to be noted that while the driver side and passenger side tube sections 30, 50 are described as being prepared with aluminum and steel, respectively, other materials, such as carbon fiber, magnesium and other suitable metal alloys, may be selected, depending on the required specifications of the vehicle in which the cross-support member 12 is to be mounted. For instance, in a performance vehicle with greater demands for reduced weight, and increased vehicle rigidity and handling, the tube sections 30, 50 may be constructed with more costly carbon fiber and aluminum, respectively. For more secure axial engagement, the tube section 30 and the joint engagement barrel 70 are preferably made with the same material.

The applicant has also appreciated that the hybrid joint cross-support member 12 may provide for more efficient and versatile assembly and mounting in a vehicle assembly line. For instance, the cross-support member 12 may be adopted for assembly and installation in a vehicle assembly line designed for manufacturing both lower cost and higher cost vehicles, by providing pre-fabricated driver side and passenger side tube sections of different materials to be assembled and installed in different combinations, depending on the specifications of each particular vehicle manufactured in the assembly line.

Figure 11:
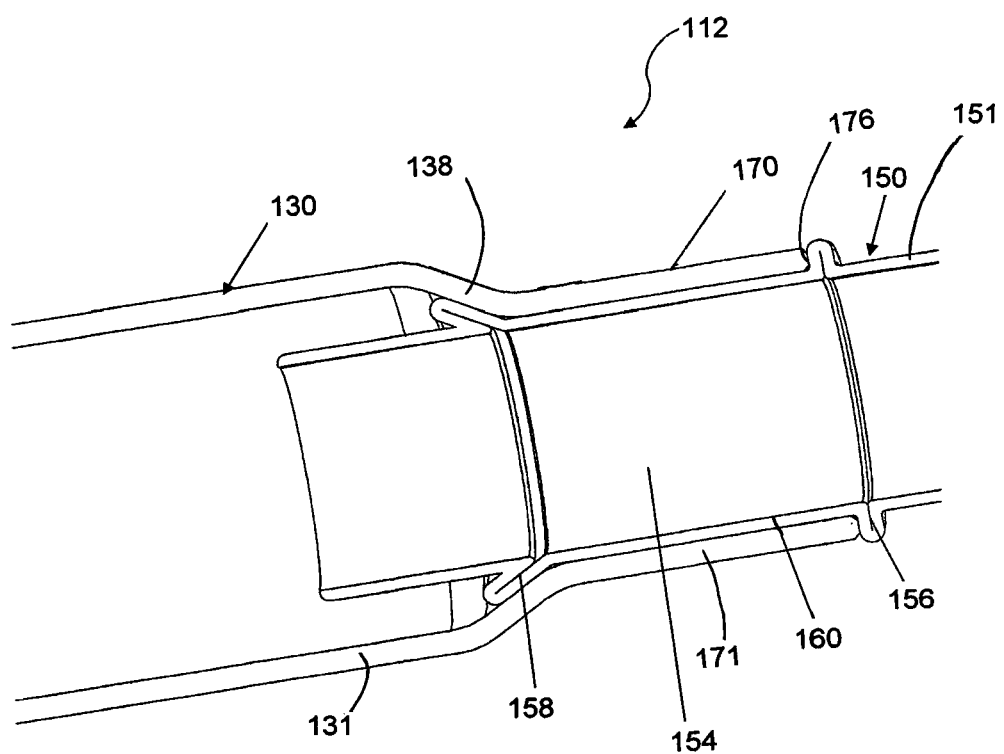
FIG. 11 is a partial cross-sectional view of a vehicle cross-support member in accordance with a preferred embodiment of the present invention.

Reference is now made to FIG. 11 which shows a partial cross-sectional view of an aluminum-steel hybrid joint cross-support member 112 in accordance with an alternative embodiment of the present invention. In contrast to the cross-support member 12, the joint cross-support member 112 incorporates a two-piece construction which broadly includes a driver side longitudinal tube section 130 and a passenger side longitudinal tube section 150.

The driver side tube section 130 is substantially similar to the tube section 30 in that it includes a longitudinally elongated, hollow tubular aluminum sidewall 131 extending from a vehicle attachment end portion (not shown) towards a beveled seating portion 138. The driver side tube section 130 differs from the tube section 30 in that an integrally-formed joint engagement barrel portion 170 extends from the seating portion 138. The barrel portion 170 includes a cylindrical sidewall 171 defining a hollow interior extending from that of the remaining portion of the driver tube section 10 to an axially open end 176. Similar to the sidewall 71, the sidewall 171 defines a plurality of longitudinally recessed slots (not shown) annularly spaced along the periphery at the open end 176 for effecting interlocking engagement with the passenger side tube section 150.

The passenger side tube section 150 is similar to the tube section 50 in that a longitudinally elongated, hollow tubular sidewall 151 is provided to extend from an axial vehicle attachment end portion (not shown) towards a mating end portion 154. The mating end portion 154 includes a tubular barrel engagement sidewall 160, a first annular compression bead 156 located between the sidewalls 151, 160 and a second annular compression bead 158 longitudinally spaced from the first compression bead 156 distal to the sidewall 151. The second compression bead 158 differs from the bead 58 in that the bead 158 extends at an obtuse angle from the barrel sidewall 160 to better conform to an inner surface of the seating portion 138 as will be described. As also will be described, the first compression bead 156 includes a plurality of annularly spaced engagement tabs (not shown) extending towards the second compression bead 158 to effect interlocking engagement with the driver side tube section 130.

For assembly, the compression bead 156 is first formed at a pre-determined longitudinal position on a blank hollow steel tube to be formed as the passenger side tube section 150, with the compression bead 156 delineating between the sidewalls 151, 160. The mating end portion 154 is axially inserted through the open end 176 to effect an interference fit between the outer peripheral surface of the barrel engagement sidewall 160 and the inner surface of the sidewall 171, until the periphery of the open end 176 abuts against the first compression bead 156. The second compression bead 158 is then formed in the hollow interior of the driver side tube section 130, such that the bead 158 is in seated engagement with the seating portion 138. The annular portions of the first compression bead 156 longitudinally aligned with the recessed slots defined by the sidewall 170 are lanced to form the engagement tabs inserted into associated recessed slots to prevent relative rotational movement between the tube sections 130, 150 during operation.

It is to be noted that for increased rigidity and strength in the engagement between the driver side and passenger side tube sections, each of the compression beads may be increased in size or number, provided that such modifications do not interfere with the construction, assembly or operation of the cross-support member. For added resistance against relative rotational movement in the frictional engagement between the joint engagement barrel/barrel portion and the mating end portion, the inner surface of the joint engagement barrel/barrel portion may be modified to include inwardly extending projections shaped for complementary engagement with projection receiving indentations defined by the outer peripheral surface of the mating end portion. Such projections and indentations are preferably introduced after fully engaging the mating end portion and the joint engagement barrel/barrel portion, using for example half shearing or lancing.

It is to be noted that the driver side and passenger side sections are not strictly limited to the co-axial arrangement in the fully assembled form as shown in FIGS. 1, 2 and 9 to 11. In an alternative embodiment, the driver side tube section 130 may be modified such that the longitudinal axis of the integral joint engagement barrel portion 170 is offset from that of the remaining portion of the driver side tube section 130. By way of a non-limiting example, the driver side tube section 130 or the beveled seating portion 138 may be modified to include an axially offset portion. Furthermore, with the cross-support member 12, the joint engagement end portion 34 may be modified to define the joint engagement aperture 36 with the origin offset from the longitudinal axis of the driver side tube section 30.

While the invention has been described with reference to preferred embodiments, the invention is not or intended by the applicant to be so limited. A person skilled in the art would readily recognize and incorporate various modifications, additional elements and/or different combinations of the described components consistent with the scope of the invention as described herein.

I claim:

1. A vehicle cross-support member for positioning in a generally transverse orientation to a length of a vehicle, the cross-support member comprising a jointed portion extending longitudinally from a first end to a second end, wherein the jointed portion comprises a first elongated member and a second elongated member coupled to the first elongated member, the first elongated member comprising a first body portion extending longitudinally from the first end to an axially open socket end portion, wherein the socket end portion comprises an inwardly tapering sidewall portion defining an axially open end, and the second elongated member comprising a second body portion extending longitudinally from the second end to a mating end portion, wherein the mating end portion comprises an insertion rod assembly having:
- an insertion rod comprising an outer engagement surface and a pair of longitudinally spaced annular abutment flanges, wherein the outer engagement surface extends between the abutment flanges; and
- an engagement barrel comprising an inner engagement surface frictionally engaging the outer engagement surface to fixedly retain the engagement barrel and the insertion rod in a mechanically coupled position, wherein the abutment flanges bear against the engagement barrel to limit axial movement thereof relative to the insertion rod,
wherein the mating end portion is received into the axially open end with a periphery of the engagement barrel being coupled to the inwardly tapering sidewall portion adjacent to the axially open end to thereby fixedly secure the first and second elongated members.

2. The vehicle cross-support member of claim 1, wherein each said first and second elongated members comprises a hollow tubular body having a lateral cross-sectional profile selected from the group consisting of a circle, an ellipse, a square, a triangle, a rectangle, a parallelogram, a trapezoid, a pentagon, a hexagon and an octagon.

3. The vehicle cross-support member of claim 1, wherein each said first and second elongated members is formed as a generally cylindrical tubular member, and the inner and outer engagement surfaces have a substantially identical radius to effect an interference fit therebetween in the mechanically coupled position.

4. The vehicle cross-support member of claim 1, wherein the engagement barrel comprises a rim defining one or more longitudinally recessed slots, one of the abutment flanges bearing against the rim, wherein the one abutment flange comprises one or more retention tabs each positioned to be received in an associated one of the recessed slots to prevent rotation of the engagement barrel relative to the insertion rod.

5. The vehicle cross-support member of claim 1, wherein each said abutment flanges comprises a compression bead integrally formed on the mating end portion by applying generally longitudinal compression thereon.

6. The vehicle cross-support member of claim 1, wherein each said first and second elongated members comprises independently of each other one or more of aluminum, steel, magnesium and carbon fiber.

7. The vehicle cross-support member of claim 1, wherein the first elongated member and the engagement barrel each comprises aluminum, and the second body portion and the insertion rod each comprises steel, wherein the first elongated member is for positioning proximal to a driver side compartment of the vehicle, and the second elongated member is for positioning proximal to a front passenger compartment of the vehicle.

8. The vehicle cross-support member of claim 1, wherein one or both of the first and second elongated members comprise an attachment bracket for securing the vehicle cross-support member to a lateral structural member of the vehicle.

* * * * *